United States Patent [19]

Mulhern

[11] Patent Number: 4,516,620
[45] Date of Patent: May 14, 1985

[54] PRIVACY SCREEN MODULE

[76] Inventor: Louise J. Mulhern, 800 Lakeshore Rd., Apt. 59, Dorval, Quebec, Canada

[21] Appl. No.: 473,669

[22] Filed: Mar. 9, 1983

[30] Foreign Application Priority Data

Oct. 21, 1982 [CA] Canada .................................. 413938

[51] Int. Cl.³ ............................................. A47G 5/00
[52] U.S. Cl. ...................... 160/351; 40/606
[58] Field of Search ............... 160/135, 377, 351, 350; 52/67; 248/DIG. 10; 40/603, 604, 605, 606, 607, 903

[56] References Cited

U.S. PATENT DOCUMENTS

| D. 107,779 | 1/1938 | Lange | 160/351 |
|---|---|---|---|
| 1,156,083 | 10/1915 | Karges | 248/DIG. 10 X |
| 1,712,858 | 5/1929 | Tsuchii | 160/135 X |
| 2,357,819 | 9/1944 | Greer | 160/351 |
| 3,713,474 | 1/1973 | Orlando | 160/351 |
| 4,085,789 | 4/1978 | Steiner et al. | 160/135 |
| 4,121,645 | 10/1978 | Behr | 160/135 |
| 4,304,216 | 12/1981 | Ratelband | 160/351 |

Primary Examiner—Peter M. Caun
Attorney, Agent, or Firm—Fetherstonhaugh & Co.

[57] ABSTRACT

A privacy screen module is disclosed that is free standing and may be joined with similar modules to make up a screened area. The screen module comprises a self-supporting stand having a hexagonal shape with parallel sides and a pair of end faces at each end, the pair of end faces having an included angle not greater than about 90°, frame having a nontransparent screen surface, the frame having upright members extending from the included angle of the stand, the upright members positioned such that a second screen module can be placed at an angle of up to about 90° on either side from an in-line position adjacent the first screen module, and the upright members of the first and second screen modules retain the same minimum distance apart.

16 Claims, 4 Drawing Figures

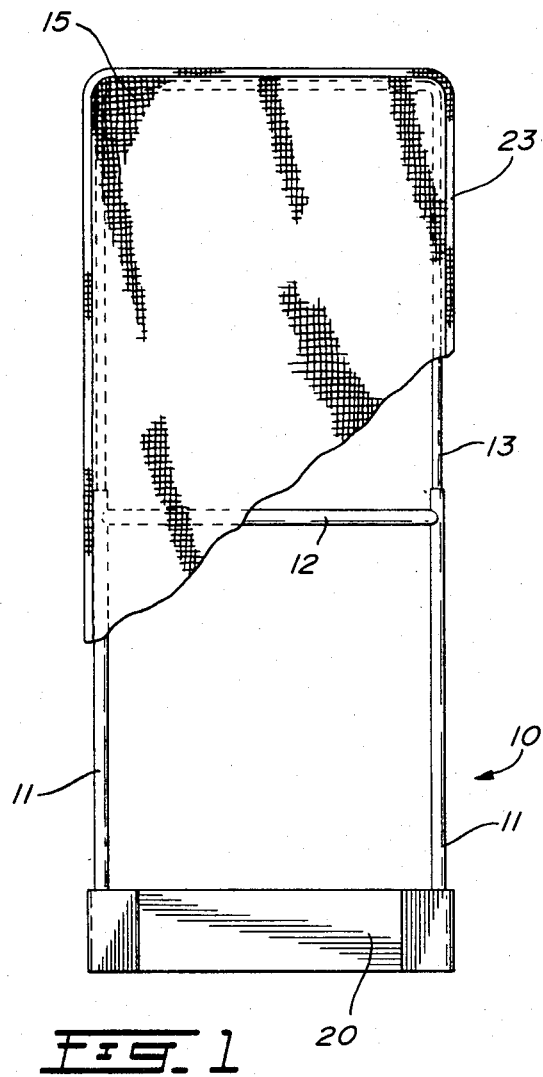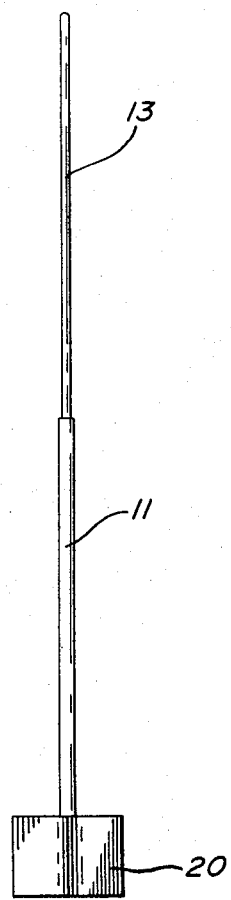

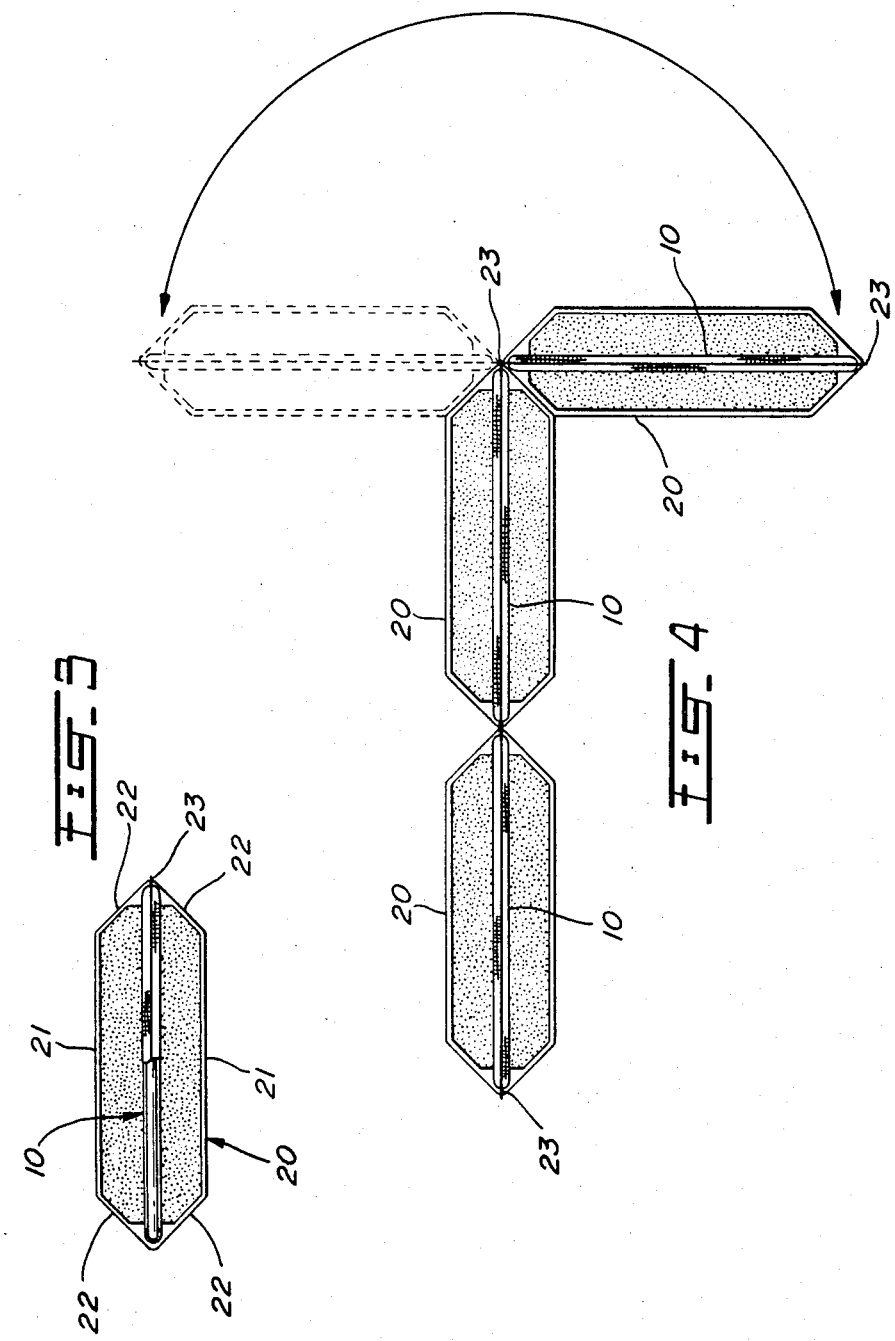

PRIVACY SCREEN MODULE

The present invention relates to a free standing privacy screen. More specifically, the invention relates to a privacy screen module that may be joined with a number of other similar modules to make up a screened area.

In this day and age when more people are living closer together, there is a requirement for people to be able to have their own privacy. Privacy screens have existed for years, however, in many cases these are formed with hinge connections to support them and are generally made from wood, metal, canvas or other similar materials. The construction of such screens generally results in a fairly heavy screen or alternatively one that tips over in a heavy wind. Privacy screens are particularly useful on apartment balconies and the like, however, they generally require guy wires or other forms of attachment to ensure that they remain vertical and stable. In some cases, screens are heavy which restricts their portability and also causes the problem of storage when they are not required.

The present invention provides a single screen module which is both lightweight and portable. The screen modules are suitable for apartment balconies, gardens or patios. Each module is the same design with a free standing base and a frame which is collapsible for ease of storage when not in use. The screen module can be used singularly or in multiples placed side by side at a variety of angles to provide an enclosed screened area.

The present invention provides a privacy screen module comprising self supporting stand having hexagonal shape with parallel sides and a pair of end faces at each end, the pair of end faces having an included angle not greater than about 90°, frame having a nontransparent screen surface, the frame having upright members extending from the included angle of the stand, the upright members positioned such that a second screen module can be placed at an angle of up to about 90° on either side from an in-line position adjacent the first screen module, and the upright members of the first and second screen modules retain the same minimum distance apart.

In preferred embodiments the stand is hollow and is adapted to contain earth, sand or other particulate material. The end faces of the supporting stand are substantially vertical. The frame may be tubular, lightweight construction with a top portion telescopically collapsible into a lower portion. A locking means is preferably provided to lock the top portion of the frame to the lower portion at any desired height. In a further embodiment the frame has a removable sleeve fitted thereover to provide a nontransparent surface. The removable sleeve may be formed from fabric and have an edge seam strip that extends outwards from the frame to join or overlap with a seam strip on the sleeve of an adjoining module.

In drawings which illustrate the embodiments of the invention:

FIG. 1 is an elevational view of one embodiment of a privacy screen module according to the present invention, showing a partial fabric sleeve.

FIG. 2 is a side elevational view of the privacy screen module shown in FIG. 1.

FIG. 3 is a plan view of the privacy screen module shown in FIG. 1.

FIG. 4 is a plan view of three privacy screen modules of the type shown in FIG. 1 arranged to form a screened area.

Referring now to the drawings, a privacy screen module of the present invention comprises a tubular frame 10 having two vertical upright posts 11 extending to approximately half the height of the frame 10. A cross piece 12 provides rigidity for the frame and a U-shaped top portion 13 has ends which slide into the vertical posts 11. The U-shaped portion 13 may be formed in two halves with a connector sleeve (not shown) to join the halves together and provide a friction fit between the ends of the top portion 13 and the posts 11, thus providing a height adjustment. The top portion 13 can be positioned at any height between the lowered or collapsed position and the upper position. Other connection devices such as a screw clamp may also be used between the ends of the top portion 13 and the posts 11. A sleeve 15 fits over the frame 10 and extends to the bottom of the frame. The sleeve 15 can be removed for washing. It is also replaceable. Different styles of sleeves 15 made in different colours or fabrics can be used on the frame 10 as desired. The sleeve 15 is preferably made of fabric, however, plastic material or other suitable flexible material may be used. The sleeve may be any type of screening device that is nontransparent. In a preferred embodiment the height adjustment for the screen is achieved without removing the fabric sleeve 15. This is achieved with a friction sliding fit between the ends of the top portion 13 and the posts 11.

A self supporting stand 20 having a hexagonal plan shape supports the frame 10. The stand 20 has two parallel sides 21 parallel with the frame 10 and a pair of end faces 22 at each end having an included angle between the faces 22 of not greater than about 90°. The stand 20 is hollow in one embodiment and the stand is molded of a lightweight plastic material. In other embodiments, wood, metal, ceramic or lightweight concrete may also be used for the stand. It may be filled with earth for use as a planter in the winter time inside an apartment or building or, alternatively, it may also be used as a planter outside with or without the screen. Alternatively, the stand 20 can be filled with sand, crushed stone, white gravel to provide an ornamental effect and also to produce additional stability. The two parallel sides 21 may be tapered inwards at the top, however, it is preferred that the end faces 22 remain substantially vertical.

The upright members 11 extend upwards from the included angle of the faces 22 and the sleeve 15 preferably has an edge seam strip or selvedge 23 which extends outside the upright members 11 so that it is substantially level with, or extends beyond the outside of the stand 20. Thus, when two stands are placed side by side as shown in FIG. 4, there is little or no space between the screens of adjacent screen modules ensuring privacy when two or more modules are combined to form a screened area. Whereas there may be as much as a three inch space between vertical posts 11 on adjacent screen modules, this space is generally filled up with overlapping edge seams or selvedges 23 which are part of the sleeves 15. Furthermore, as shown in FIG. 4 an adjacent screen can be placed at an angle of up to about 90° on either side from an in-line position and yet the edge seam strip 23 of the sleeves 15 of the adjacent screens join or overlap and little or no space remains between the screens, thus ensuring privacy.

When not in use as a privacy screen, the frame may either be collapsed or, alternatively, removed completely from the stand 20 and the stand can remain as a planter in the house or apartment. The only storage necessary is then the collapsed frame which can be stored in the back of a cupboard or the like.

Various changes may be made to the scope of the present invention, which is limited only by the following claims.

The embodiments of the invention in which an exclusive property or privilege is claimed are defined as follows:

1. A privacy screen module comprising a self supporting open topped stand having hexagonal shape with parallel sides and a pair of end faces at each end, said stand adapted for being filled through said open top with particulate material for thereby providing stability for said stand, the pair of end faces having an included angle not greater than about 90°, said frame having a nontransparent screen surface, the frame having upright members extending from the included angles of the stand, t upright members positioned such that a second screen module can be placed at an angle of up to about 90° on either side from an in-line position adjacent the first screen module, and the upright members of the first and second screen modules retain the same minimum distance apart.

2. The privacy screen module according to claim 1 wherein the frame is a tubular lightweight construction with a top portion telescopically collapsible into a lower portion.

3. The privacy screen module according to claim 1 wherein the end faces of the supporting stand are substantially vertical.

4. The privacy screen module according to claim 2 wherein a locking means is provided to lock the top portion of the frame to the lower portion at any desired height.

5. The privacy screen module according to claim 1 wherein the frame has a removable sleeve fitted thereover to provide a nontransparent surface.

6. The privacy screen module according to claim 5 wherein the removable sleeve is formed from fabric and has an edge seam strip that extends outwards from the frame to join or overlap with a seam strip on the sleeve of an adjoining module.

7. A privacy screen module, comprising:
   (a) a ground supported stand of hexagonal shape having parallel sides and angularly disposed interconnected end face members extending from a first and second spaced end of said sides;
   (b) said end face members at each of said ends define an included angle not exceeding 90°;
   (c) said stand includes a ground supported lower surface from which said sides and said end face members extend for thereby defining a receptacle having an open upper end adapted to be filled with particulate material for thereby providing stability for said module;
   (d) an upright member extends a substantial distance from each of said included angles; and,
   (e) a cross piece connects said upright members at generally the upper end thereof and therewith defines a first frame.

8. The module as defined in claim 7, wherein:
   (a) said upright members are disposed in spaced parallel relation.

9. The module as defined in claim 8, wherein:
   (a) each of said upright members has an open upper end;
   (b) a pair of parallel leg members are interconnected by a link piece at one end thereof and together define an upper frame; and,
   (c) a second end of each of said leg members is telescopically received in one of said upper ends for thereby permitting said upper frame to be positioned between a first extended position and a second collapsed position.

10. The module as defined in claim 9, wherein:
    (a) a removable sleeve has a nontransparent surface and extends from said link piece and between said leg members.

11. The module as defined in claim 10, wherein:
    (a) said sleeve extends downwardly a substantial distance below said cross piece and between said uprights.

12. The module as defined in claim 10, wherein:
    (a) said sleeve is comprised of fabric.

13. A privacy screen module, comprising:
    (a) a ground supported hexagonal member having parallel side edges and angularly disposed end face portions at a first and second end thereof defining an included angle not exceeding 90°;
    (b) parallel sides extend upwardly from said side edges;
    (c) end face members extend upwardly from said end face portions and are interconnected with said sides to therewith provide a stand;
    (d) said stand has an open upper end, the opening thereof is contiguous with the upper end of said sides and said end face members for therewith providing a receptacle adapted to be filled with particulate material to provide stability for said stand;
    (e) an upright member extends a substantial distance from each of said included angles; and,
    (f) a cross piece connects said upright members at generally the upper end thereof and therewith defines a first frame.

14. The module as defined in claim 13, wherein:
    (a) said upright members are disposed in spaced parallel relation and said upright members each has an upper end spaced a equal distance from said hexagonal member.

15. The module as defined in claim 14, wherein:
    (a) said upright members are tubular and said upper ends are open;
    (b) a generally U-shaped upper frame has a pair of lower end portions; and,
    (c) each of said lower end portions is telescopically received in one of said upper ends for thereby permitting said upper frame to be positioned between a first extended position and a second collapsed position.

16. The module as defined in claim 15, wherein:
    (a) a non-transparent sleeve extends between the leg members of said upper frame.

* * * * *